United States Patent [19]

Salter

[11] Patent Number: 4,522,503

[45] Date of Patent: Jun. 11, 1985

[54] MIXING APPARATUS

[75] Inventor: Keith Salter, Ailsworth, England

[73] Assignee: Baker Perkins Holdings PLC, England

[21] Appl. No.: 637,156

[22] Filed: Aug. 2, 1984

[30] Foreign Application Priority Data

Aug. 10, 1983 [GB] United Kingdom ............... 8321501

[51] Int. Cl.³ .............................................. B01F 7/00
[52] U.S. Cl. .................................... 366/287; 366/343
[58] Field of Search ............... 366/261, 279, 287, 241,
366/288, 343, 342

[56] References Cited

U.S. PATENT DOCUMENTS

| Re. 15,746 | 1/1924 | Westerman | 366/287 |
| 1,475,978 | 12/1923 | Westerman | 366/287 |
| 3,338,562 | 8/1967 | Fox | 366/287 |
| 4,311,397 | 1/1982 | Wright | 366/287 |

Primary Examiner—Robert W. Jenkins

Attorney, Agent, or Firm—Steele, Gould & Fried

[57] ABSTRACT

Bread-dough mixing apparatus 1 comprises a support member 2, a shaft-support structure 3 carried by and rotatable relative to the support member 2, a drive shaft 4 and a driven shaft 5 rotatably mounted on the shaft-support structure 3, and a flexible coupling 6 connecting one end (4b) of the drive shaft 4 with one end (5a) of the driven shaft 5. The shafts 4, 5 are mounted on the shaft-support structure 3 so that their axes of rotation 7, 8 are inclined to each other. A mixer element 9 is carried by the other end (5b) of the driven shaft 5 so as to rotate therewith. An electric motor 15, a belt drive 16 and a pulley 17 are provided for rotating the drive shaft 4 so that the driven shaft 5 flexibly coupled thereto rotates the mixer element 9. An electric motor 18, a belt drive 19 and a pulley 20 are provided for rotating the shaft-support structure 3 about an axis which is common with the axis (7) of rotation of the drive shaft 4, whereby the end 5b of the driven shaft executes planetary motion about the common axis 7.

7 Claims, 3 Drawing Figures

MIXING APPARATUS

BACKGROUND TO THE INVENTION

This invention relates to mixing apparatus.

The mixing apparatus of the invention is particularly applicable to working doughs or batters for bakery products such as bread or cakes. However, it also has other applications, for example, mixing of chemicals or paints.

A significant contribution to the bread-dough mixing art was made in 1979 and is represented by U.K. Patent Specification Nos. 2,015,362 and 2,017,480 of Baker Perkins Holdings Limited.

Briefly, the contribution comprises working the dough in a two-stage operation, one of which is performed using planetary motion and the other using simple rotary motion.

The new mixing apparatus, (see U.K. Patent Specification No. 2,015,362), although very efficient, involved use of a complicated gearbox assembly for performing the two motions.

The present invention dispenses with the need for a gearbox, thus alleviating production problems and reducing expense.

SUMMARY OF THE INVENTION

According to the present invention, mixing apparatus comprises a support member, a shaft-support structure carried by and rotatable relative to the support member, a drive shaft and a driven shaft each rotatably mounted on the shaft-support structure, flexible coupling means connecting one end of the drive shaft with one end of the driven shaft, the shafts being disposed so that their axes of rotation are inclined to each other, a mixer element carried by the other end of the driven shaft so as to rotate therewith, means for rotating the drive shaft so that the driven shaft rotates the mixer element, and means for rotating the shaft-support structure about an axis common with the axis of rotation of the drive shaft, whereby the end of the driven shaft which carries the mixer element executes planetary motion about said common axis.

BRIEF DESCRIPTION OF THE DRAWINGS

An embodiment of the invention will now be described by way of example only, with reference to the accompanying drawings, wherein.

Figure 1:
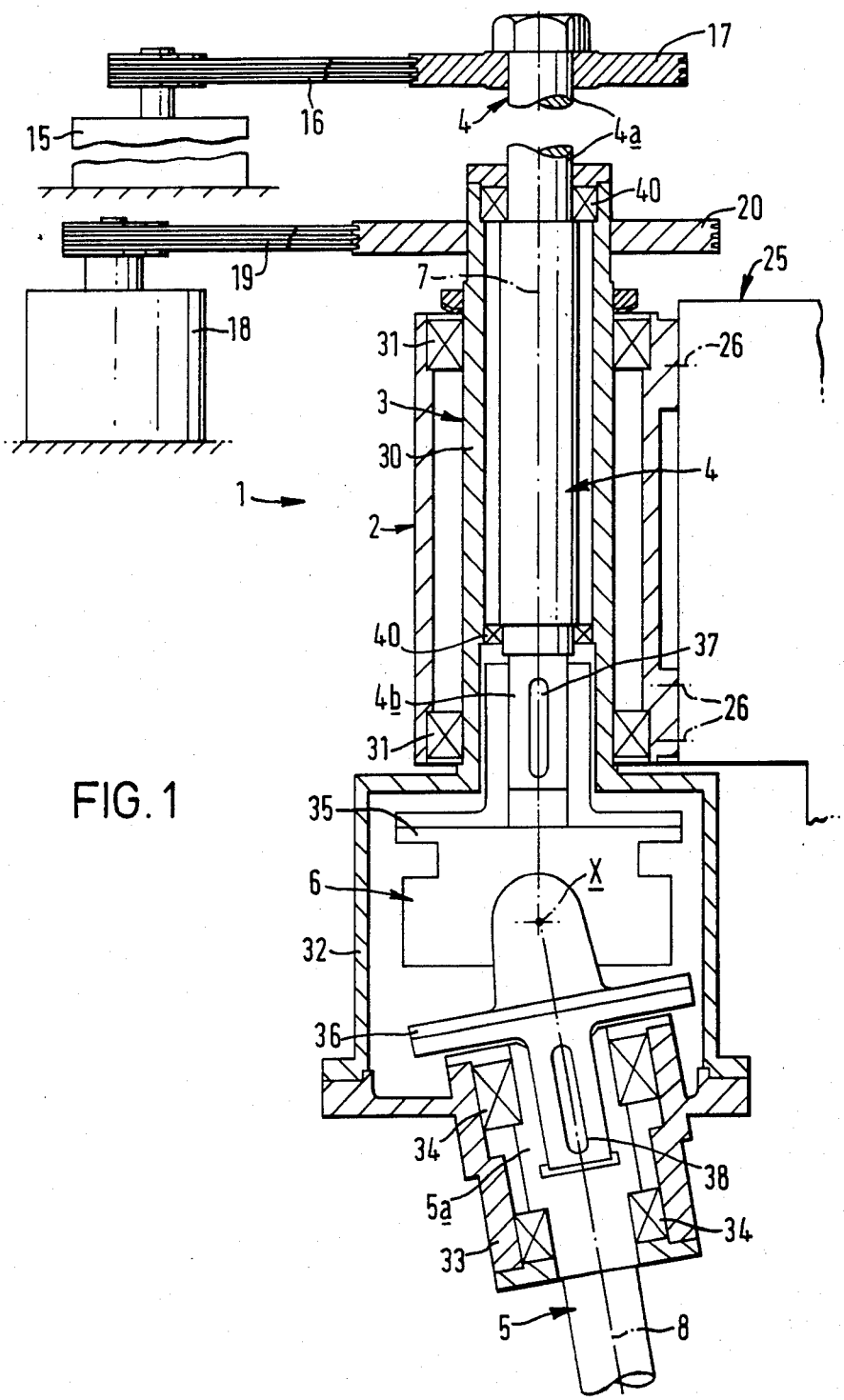
FIG. 1 is a fragmentary side view, in medial section, of the upper part of dough mixing apparatus.

Attention is also directed to the disclosures of the above-mentioned U.K. Patent Specification No. 2,015,362, as the present invention can be viewed as a modification or improvement of the apparatus described and illustrated by that patent.

DETAILED DESCRIPTION OF THE PREFERRED EMBODIMENT

With reference to the figures, bread-dough mixing apparatus 1 comprises a support member 2, a shaft-support structure 3 carried by and rotatable relative to the support member 2, a drive shaft 4 and a driven shaft 5 rotatably mounted on the shaft-support structure 3, and flexible coupling means 6 connecting one end (4b) of the drive shaft 4 with one end (5a) of the driven shaft 5. The shafts 4, 5 are mounted on the shaft-support structure 3 so that their axes of rotation 7, 8 are inclined to each other. A mixer element 9 is carried by the other end (5b) of the driven shaft 5 so as to rotate therewith. Means comprising an electric motor 15, a belt drive 16 and a pulley 17 are provided for rotating the drive shaft 4 so that the driven shaft 5 flexibly coupled thereto rotates the mixer element 9. Similar means comprising an electric motor 18, a belt drive 19 and a pulley 20 are provided for rotating the shaft-support structure 3 about an axis which is common with the axis (7) of rotation of the drive shaft 4, whereby the end 5b of the driven shaft executes planetary motion about the said common axis 7.

The support member 2, which is of generally tubular form, is secured to a stand 25 by fixing bolts 26. The shaft-support structure 3 comprises a housing of generally tubular form, and of stepped section. (When viewed in axial cross-section, i.e. as illustrated in FIG. 1). The upper section 30 of the structure 3 comprises a hollow shaft, rotatably supported within the member 2 by bearings 31 carried by the member. The lower section 32 of the structure 3 carries a detachable housing 33 wherein the upper end of driven shaft 5 is rotatably supported by bearings 34.

Figure 2:
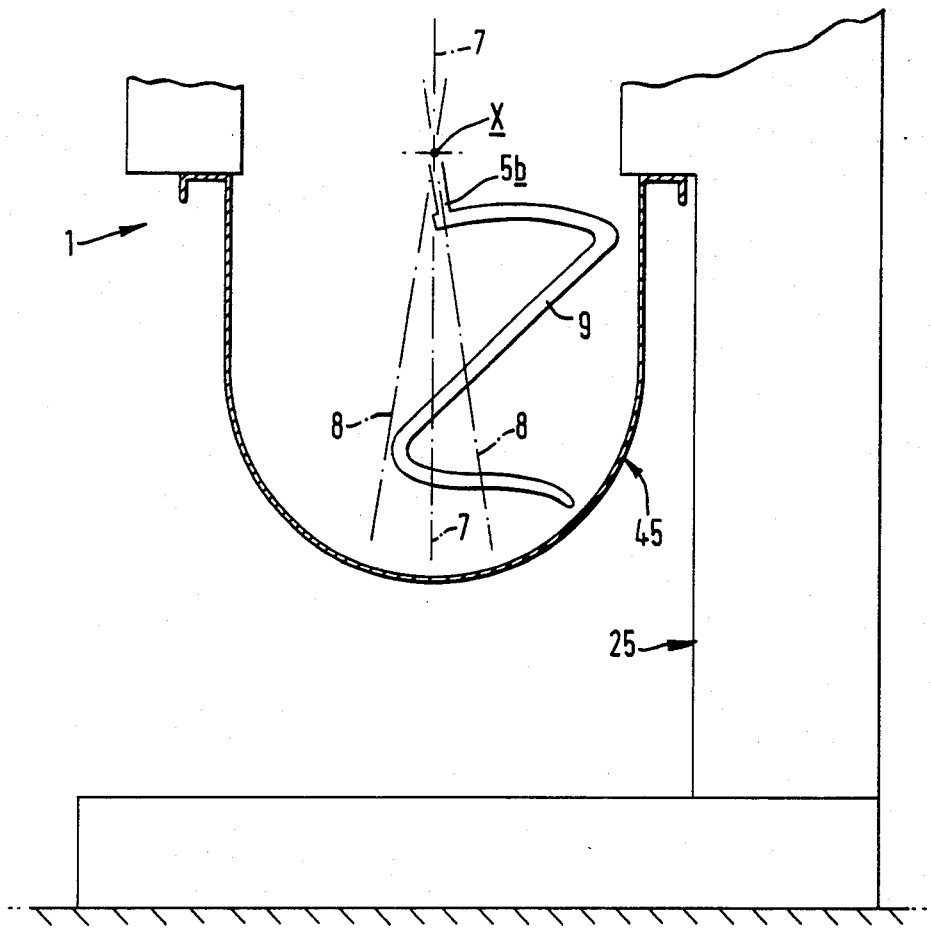
FIG. 2 is a fragmentary side view, in medial section, of the lower part of the mixing apparatus.

The adjacent ends 4b, 5a of the drive and driven shafts 4, 5 are connected to flange members 35, 36 of the flexible coupling means 6, by way of key/keyway assemblies 37/38. The flexible coupling means 6 of FIG. 1 comprises in this example, a Hook's type universal joint. One of the two intersecting axes of the cross bearings of the coupling means 6 is indicated at X, the other axis being in the plane of FIG. 1 and FIG. 2.

The drive shaft 4 is rotatably disposed within the hollow shaft formed by the upper section 30 of the shaft-support structure 3. The shaft 4 is rotatably supported by bearings 40, whereby shaft 4 can rotate relative to the shaft-support structure 3.

The mixer element 9 is of generally helical form, the axis of which coincides with axis 8.

Pulley 17 is secured to upper end 4a of the drive shaft 4. Pulley 20 is secured to the exterior of upper section 30. Pulleys 17 and 20 may be rotated at about 300 RPM and 100 RPM respectively.

The mixing apparatus 1 employs a mixing bowl 45 (FIG. 2) within which mixer element 9 is disposed. The bowl 45 is shown in known manner in a raised position for mixing, with seals and other components usually associated with dough-mixing apparatus omitted for reasons of clarity. (See U.K. Patent Specification No. 2,015,362 for details).

With bread-dough ingredients already introduced into the bowl 45, the motor 15 is actuated to rotate drive shaft 4 whereby driven shaft 5 and mixing element 9 execute a simple rotary motion. Simultaneously the motor 18 is actuated to rotate the shaft support structure 3 and thus housing 33 in which the driven shaft is supported, whereby the mixing element 9 also orbits about the vertical axis 7, executing a planetary motion.

After a predetermined period, (say 150 seconds), the motor 18 is stopped. With the shaft-support structure 3 stationary, (brake means may be provided to ensure this), the electric motor 15 continues running so as to rotate drive shaft 4 and thus driven shaft 5. The mixer element 9 can only rotate about the inclined axis 8, executing the simple rotary motion.

Change-over from planetary to simple rotary motion can be performed automatically, using a timing device, or energy measurement.

The electric motors 15, 18 could be replaced by hydraulic motors. The mixer element 9 may be replaced by a mixer element of different shape, if required. (For example, the element of FIG. 5 or 6 of U.K. Patent Specification No. 2,015,362).

Scraper elements may be provided to shear the dough.

Figure 3:
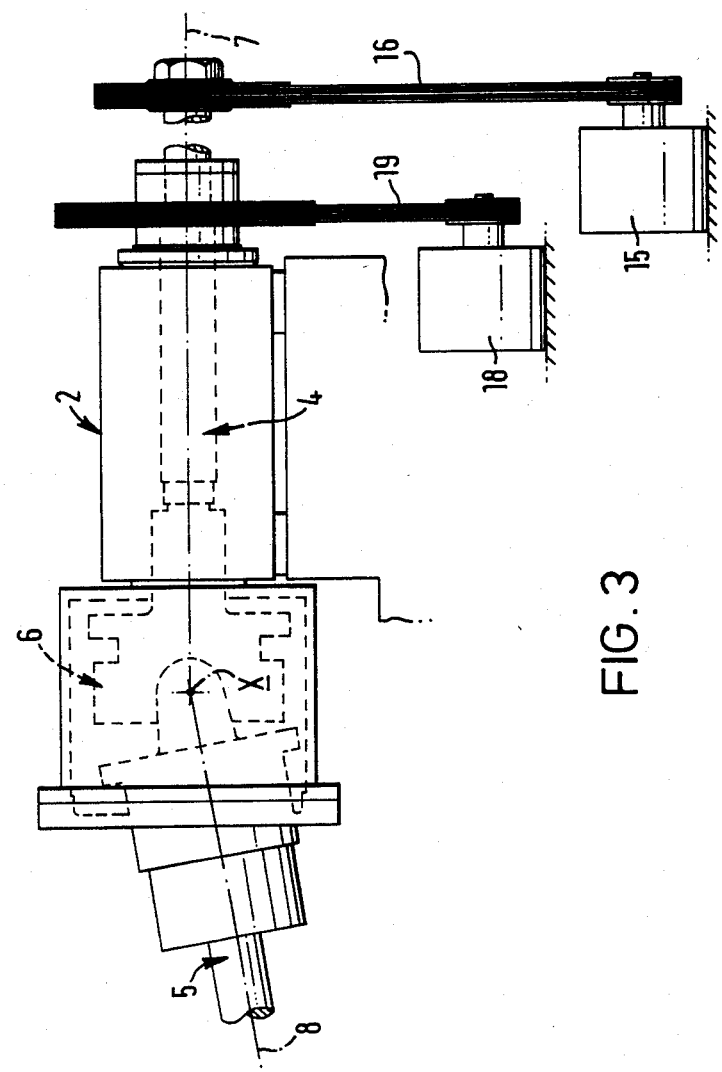
FIG. 3 illustrates a modification.

In the embodiment of FIG. 1, the drive shaft 4 is rotatable about a substantially vertical axis, namely axis 7. However, the mixing apparatus of the invention could be used in other attitudes. For example, with the axis 7 disposed substantially horizontal, as illustrated in FIG. 3.

The invention allows the use of running seals of smaller diameter than hitherto. This is because the gearbox assembly, (referred previously in this specification), now dispensed with, made use of large diameter seals.

I claim:

1. Mixing apparatus, comprising:
   a support member;
   a shaft-support structure carried by and rotatable relative to the support member;
   a drive shaft and a driven shaft each rotatably mounted on the shaft-support structure;
   flexible coupling means connecting one end of the drive shaft with one end of the driven shaft, the shafts being disposed so that their axes of rotation are inclined to each other;
   a mixer element carried by the other end of the driven shaft so as to rotate therewith;
   means for rotating the drive shaft so that the driven shaft rotates the mixer element; and,
   means for rotating the shaft-support structure about an axis common with the axis of rotation of the drive shaft.

2. Mixing apparatus as claimed in claim 1, wherein the means for rotating the shaft-support structure comprises a hollow shaft, said drive shaft being disposed within said hollow shaft.

3. Mixing apparatus as claimed in claim 1, wherein the drive shaft is rotatable about a substantially vertical axis.

4. Mixing apparatus as claimed in claim 1, wherein the drive shaft is rotatable about a substantially horizontal axis.

5. Mixing apparatus as claimed in claim 1, wherein the driven shaft is rotatably disposed within a housing detachably attached to the shaft-support structure.

6. Mixing apparatus as claimed in claim 1, wherein the flexible coupling means comprises a Hooke's type universal joint.

7. Mixing apparatus as claimed in claim 1, wherein the mixer element is of generally helical form.

* * * * *